May 28, 1935.  A. W. BEESON  2,003,064
CAGE FOR PARISON MOLDS
Filed April 27, 1932  2 Sheets-Sheet 1

Arthur W. Beeson, Inventor

By Eccleston + Eccleston, Attorneys

May 28, 1935.  A. W. BEESON  2,003,064
CAGE FOR PARISON MOLDS
Filed April 27, 1932  2 Sheets-Sheet 2

Inventor,
Arthur W. Beeson

By Eccleston & Eccleston
Attorneys

Patented May 28, 1935

2,003,064

UNITED STATES PATENT OFFICE 2,003,064

CAGE FOR PARISON MOLDS

Arthur W. Beeson, Washington, Pa., assignor to Hazel-Atlas Glass Company, Wheeling, W. Va., a corporation of West Virginia Application April 27, 1932, Serial No. 607,860

4 Claims. (Cl. 49—9)

This invention relates to cages for glass molds, and particularly for parison molds used in that type of forming machine in which the parison mold is telescopically arranged with respect to the blow mold, so as to permit the parison mold to be raised into engagement with the neck ring, and thereafter lowered so as to leave the parison suspended and to permit it to be inclosed by the blow mold.

In the use of parison molds in this general type of forming machine, considerable difficulty has been encountered by reason of the upward expansion of the parison mold, which destroys the exact fit between the neck ring and the parison mold, when the latter is in its raised position, and causes jamming between these parts, thereby interrupting the smooth functioning of the machine.

It has been suggested previously that a spring be interposed between the parison mold and its support, to compensate for changes in the vertical dimensions of the parison molds or other parts, but such an arrangement is not successful practically, because while the parison mold is in its elevated position it is subjected to the pressure of a pressing plunger, and for the proper functioning of such plunger the support for the parison mold should be rigid.

The primary object of the present invention is to provide some means, such as a cage or the like, to support the parison mold from its upper end and permit it to expand freely downward, whereby the relation between the neck ring and the upper end of the parison mold when in elevated position will remain fixed, whatever the expansion of the parison mold may be.

Other objects and advantages of the invention will be apparent to those skilled in the art from the following description when taken in connection with the accompanying drawings, in which Figure 1 is a vertical section through a parison mold and its supporting means.

Figure 1:
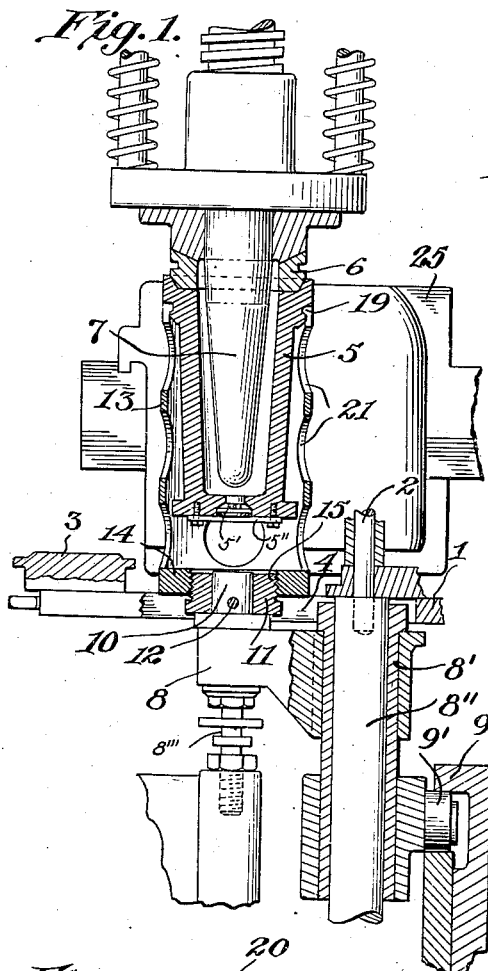
Figure 2:
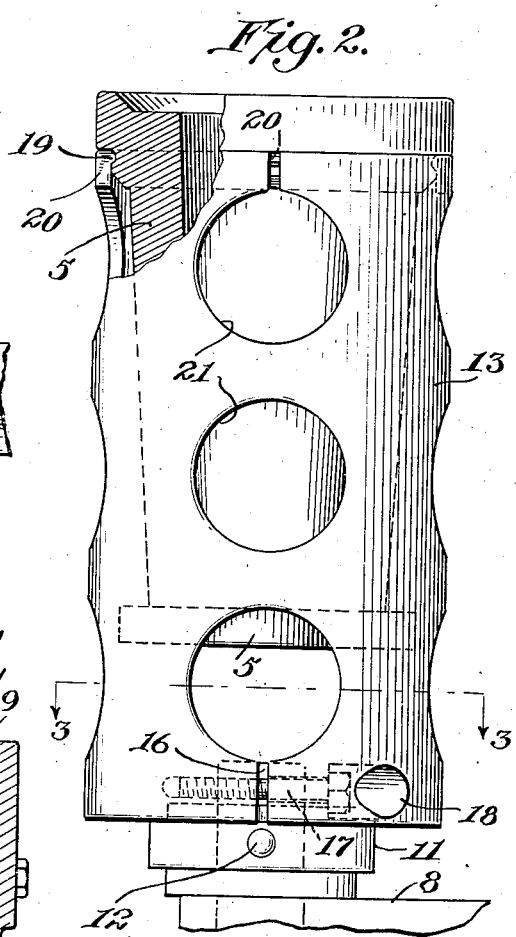
Figure 2 is a side elevational view thereof partly in section.
Figure 4:
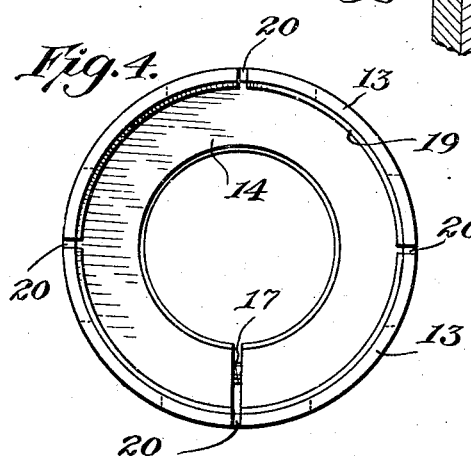
Figure 4 is a plan view of the cage per se, which supports the mold.
Figure 3:
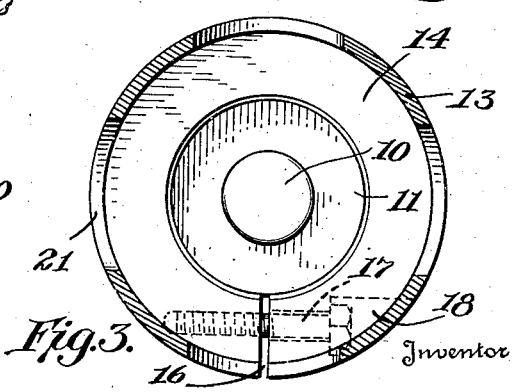
Figure 3 is a horizontal sectional view taken on line 3—3 of Figure 2.
Figure 5:
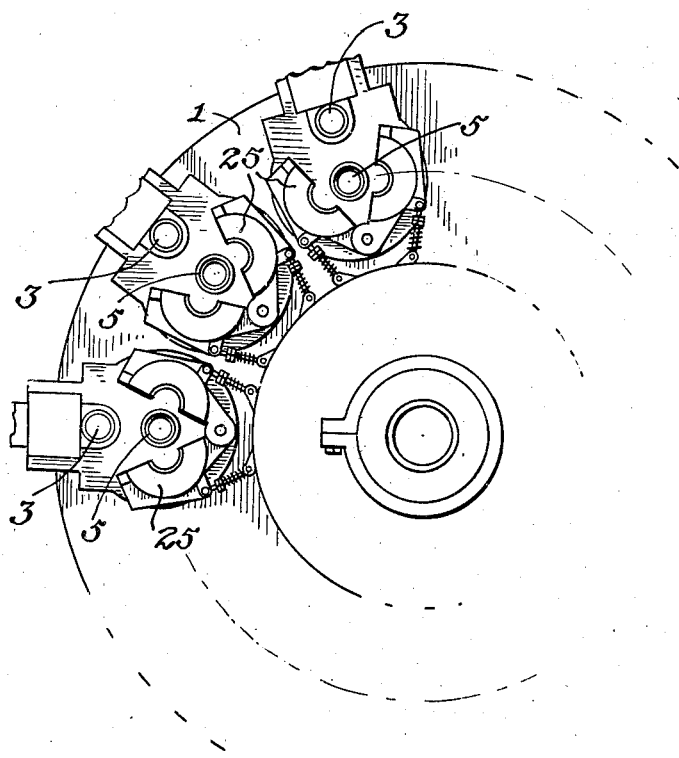
Figure 5 is a fragmentary plane view of a single table machine, and illustrating more or less diagrammatically a plurality of glass forming units mounted thereon.

Referring to the drawings more in detail, the numeral 1 indicates a portion of the conventional mold table on which the molds and related parts are supported and carried to the charging station, pressing station, etc. This table is provided with the usual pivotal supports 2 for the neck ring sections, the blow mold bottoms 3, blow molds 25, and all the other parts common to this type of forming machine. The table is also provided with openings 4 to permit raising and lowering the parison mold 5 into and out of cooperative relation with the neck ring 6. The usual valve 5' is mounted in the bottom of the parison mold, and is held in place by the bar 5''. The usual pressing plunger is indicated by numeral 7.

Numeral 8 refers to an arm fixed to a sleeve 8' slidable on a rod 8''. The arm is raised and lowered at the proper times by any desired mechanism. In the present machine the arm is raised by an air cylinder (not shown), and lowered by means of cam track 9 and cooperating roller 9' carried by the sleeve 8'. After the arm has been elevated it is preferably supported by an anvil 8''' during the pressing operation. All of this mechanism is old and well known and a detailed description is unnecessary.

Mounted in the arm 8 for vertical adjustment is a stud 10 on which is secured a collar 11, as by means of a cotter pin 12. Mounted on this collar 11 is a cage or pot 13 adapted to support the parison mold 5.

The cage 13 is provided with a thickened, inwardly directed annular base portion 14 having a threaded opening 15. This portion of the cage is slotted as indicated at 16 and a clamping bolt 17 is threaded into it through an opening 18. The cage is screwed on the collar 11, and then by tightening up on the bolt 17 the cage is locked in position.

The upper end of the cage is provided with an inwardly directed bead 19 adapted to snap into an annular notch formed adjacent the mouth of the parison mold, and in order to provide the necessary resiliency for this purpose the upper edge of the cage is provided with a plurality of vertical slots 20, there being four such slots shown in the present embodiment.

The cage 13 is adapted to receive molds of various lengths, according to the particular article being manufactured, and hence the cage is made of a length somewhat greater than that of the largest parison mold to be used with it. The wall of the cage is spaced from the wall of the parison mold, so that there will be no undue heating of the cage, and to assist in the free circulation of air the cage is preferably provided with a plurality of openings 21.

From the foregoing description it will be apparent that the expansion of the parison mold must be downward, as it is supported at its upper end and is free at its lower end. Consequently, when the cage and mold are moved upward by the travel of the roller 9' on the cam track 9, the mold will always be brought to exactly the same point of elevation, irrespective of the temperature of the mold, so that there will be no jamming of parts. It will be understood, of course, that the cage and mold are capable of being adjusted up or down, through the vertical adjustment of the stud 10 and collar 11 which, per se, is old.

It will also be apparent that while in accordance with the present invention the mold is always brought to a fixed position when elevated, regardless of mold expansion or contraction, it is also rigidly supported in such elevated position, so that the pressing operation may be properly performed.

It will also be apparent that by reason of the specific structure of the upper end of the cage, a parison mold can be quickly removed and another mold quickly snapped into position.

It should be understood that while a specific structure of the cage has been illustrated and described, yet the invention is in no manner limited to the particular structure, but relates broadly to the provision of means to permit the free expansion of the parison mold downwardly, thereby preventing the jamming of parts, and the consequent interruption of manufacture of glassware, which has been a common occurrence heretofore, particularly when rather long parison molds are being used.

In accordance with the patent statutes I have described what I now believe to be the preferred embodiment of the invention, but obviously it is subject to many changes and modifications, all of which I aim to include within the scope of the appended claims.

What I claim is:

1. A glass forming machine comprising a single rotary table, a plurality of glass forming units carried by the table, each unit including a parison mold, a blow mold and a neck ring, both molds adapted to be brought into cooperative relation with the neck ring, means for elevating the parison mold into cooperative relation with the neck ring, and means supporting the parison mold solely from its top, whereby the parison mold may expand freely downward from its top to prevent jamming, said supporting means throughout its length being substantially within the greatest diameter of the parison mold.

2. A glass forming machine comprising a single rotary table, a plurality of glass forming units carried by the table, each unit including a parison mold, a blow mold and a neck ring, both molds adapted to be brought into cooperative relation with the neck ring, an elevating member, means for raising and lowering said member, and a cage mounted on said member, said parison mold suspended at its top from the top of said cage to permit free downward expansion of the parison mold, said cage throughout its length being substantially within the greatest diameter of the parison mold.

3. A glass forming machine comprising a single rotary table, a plurality of glass forming units carried by the table, each unit including a parison mold, a blow mold and a neck-ring, both molds adapted to be brought into cooperative relation with the neck ring, an elevating member, means for raising and lowering the elevating member, a cage mounted on the elevating member, and a snap connection between the top of the cage and the top of the parison mold.

4. A glass forming machine comprising a single rotary table, a plurality of glass forming units carried by the table, each unit including a parison mold, a blow mold and a neck ring, both molds adapted to be brought into cooperative relation with the neck ring, an elevating member, means for raising and lowering the elevating member, a cage mounted on said member, said cage provided with openings to permit free circulation of air, and a snap connection between the top of the cage and the top of the parison mold.

ARTHUR W. BEESON.